March 20, 1951 W. S. ALDRICH ET AL 2,546,054

OPTICAL PROJECTING APPARATUS FOR A DISK WITH CONCENTRIC TRACKS OF MATTER TO BE PROJECTED

Filed Nov. 4, 1947 2 Sheets-Sheet 1

Inventors:
William Stanley Aldrich and
Edward Charlton Aldrich;
By Baldwin & Wight, Attys.

Inventors:
William Stanley Aldrich and
Edward Charlton Aldrich;
By their attorneys,
Baldwin & Wight Patented Mar. 20, 1951 2,546,054

UNITED STATES PATENT OFFICE 2,546,054

OPTICAL PROJECTING APPARATUS FOR A DISK WITH CONCENTRIC TRACKS OF MATTER TO BE PROJECTED

William Stanley Aldrich, Chaldon, near Caterham, and Edward Charlton Aldrich, Shirley, England, assignors to The British Vibralux Limited, London, England Application November 4, 1947, Serial No. 783,946
In Great Britain May 14, 1941

Section 1, Public Law 690, August 8, 1946
Patent expires May 14, 1961

1 Claim. (Cl. 88—27)

This invention relates to optical projecting apparatus of the kind adapted for the production of displays upon screens.

The invention has for its main object to provide an apparatus which will give an improved and pleasing display effect.

A further object is to provide a new and improved construction and arrangement of such projecting apparatus which is efficient and reliable in operation while being economic to run and maintain.

A still further object is to provide a projecting apparatus applicable for use with translucent and opaque screens so as to produce effective advertisement signs, notices and other displays either fixed, intermittent or continuous in theatres, cinemas, shop windows, foyers, show cases, show rooms, railway stations, post offices, and so forth, as well as being applicable for use for producing luminous displays on internal or external screens for advertising and other purposes under normal lighting conditions.

These objects are achieved according to the present invention by providing a rotatable disc for supporting matter to be projected, rollers supporting the disc at its edge for rotation, means to drive constantly one of the rollers to rotate the disc, the matter for display being disposed in separate items arranged in annular tracks concentric with the axis of rotation of the disc and the said items forming sets to provide a composite matter for display, a plurality of optical projectors one for each track on the disc, and the said projectors being positioned for direct projection to the same projection area of a single screen and means to bring the disc to rest for a predetermined period with the items of the different sets held in register with the respective projector, the said means comprising a detent to engage angularly spaced abutments on the disc and a release device operated by the constantly driven roller to move the detent clear of the abutments.

The invention will now be described with reference to the accompanying drawings wherein similar references indicate like parts.

Figure 1:
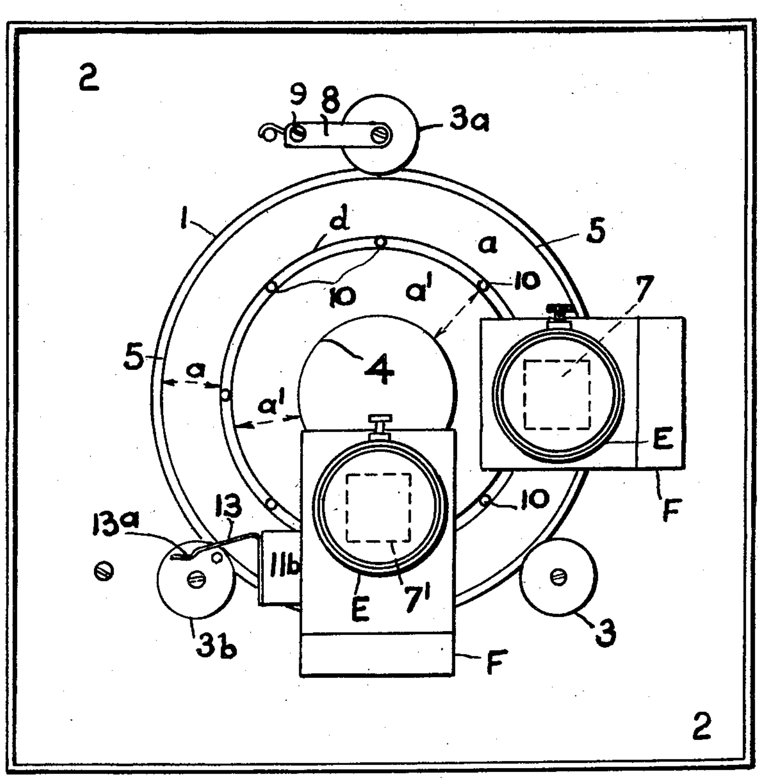
Figure 2:
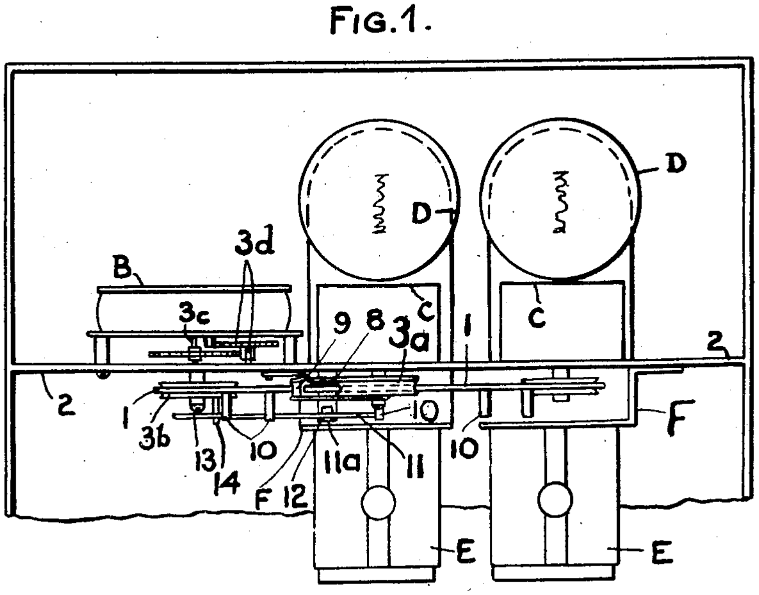
Figures 3, 4, 6:
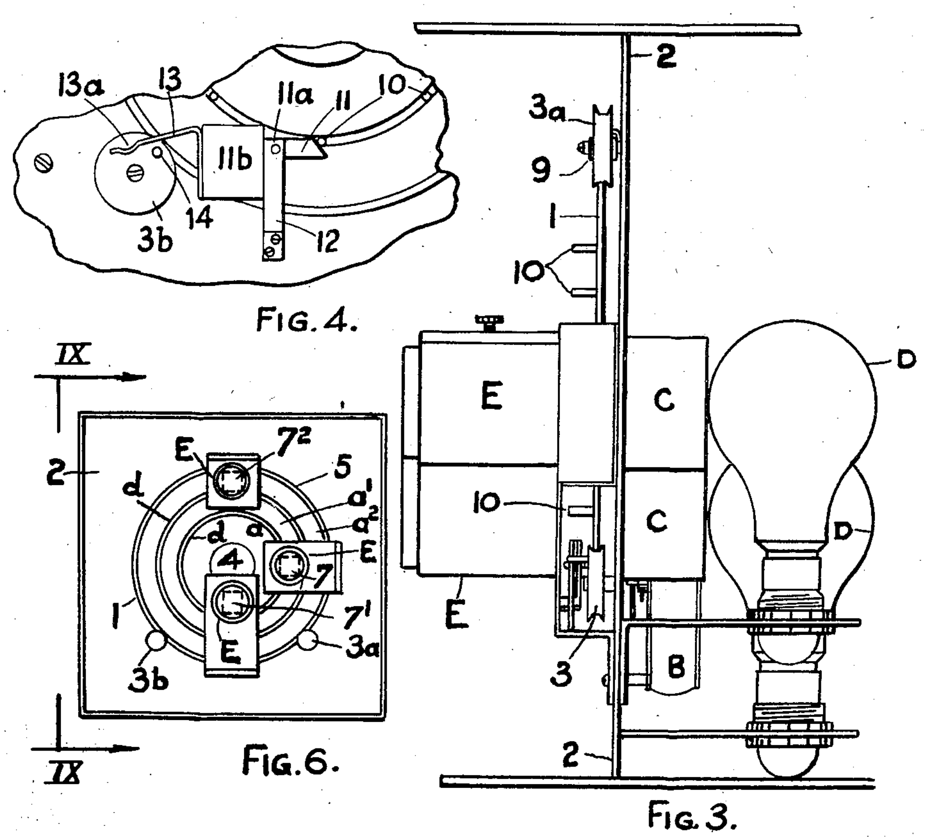
Figure 5:
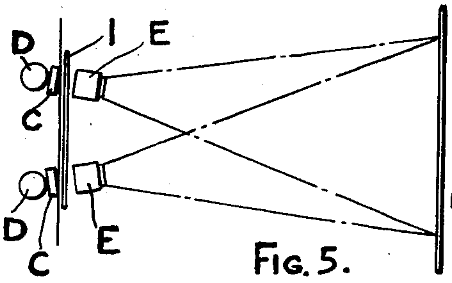
Figure 7:
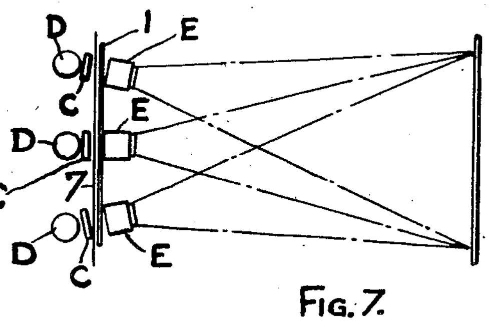

Fig. 1 is a front view, Fig. 2 a fragmental plan view and Fig. 3 a side view and Fig. 4 is a local elevation of one construction of projecting apparatus in accordance with the present invention. Fig. 5 is a diagrammatic view illustrating the projection upon a screen, obtained with the projecting apparatus illustrated in Figs. 1 to 4. Fig. 6 is a diagrammatic front view on a small scale illustrating a further modification of projecting apparatus in accordance with the present invention, and Fig. 7 is a diagram illustrating the projections obtained with apparatus constructed in accordance with Fig. 6.

Referring to the drawing, 1 indicates the record disc of clear glass or other suitable transparent or translucent material which carries the matter to be displayed arranged in two concentric annular tracks *a*, *a′* separated from each other by an opaque ring *d*, the inner edge of the record track *a′* being defined by the opaque disc 4 of smaller diameter which is arranged or mounted centrally of the record disc 1; 2 is a base furnished with two aperture gates 7, 7′ arranged therein so that the aperture gate 7 registers with the annular record track *a* on the record disc, while the aperture gate 7′ registers with the inner concentric record track *a′* of the record disc. The record disc is mounted in front of the base 2 edgewise upon grooved pulleys on rollers 3, 3*a*, 3*b* that are rotatably mounted and arranged upon the base and connected with a suitable motor B so that one or more of such pulleys or rollers can rotate the record disc past the aperture gates and the corresponding optical projecting lens systems with its corresponding annular records in register therewith so as to produce the desired moving display upon the screen with which the projecting apparatus is arranged to co-operate.

The angular positions of this gate 7, 7′ relatively to the rotating record disc 1 is arranged so as to simulate displays which simultaneously move in different directions across the screen. Thus, in the construction illustrated, if the record disc 1 is rotated in a clockwise direction the projection through the gate 7 at the 3 o'clock position appears to run vertically up the screen, while that projected through the gate 7′ at the 6 o'clock position of the annular record track *a′* appears to run transversely of the screen.

The projections through each gate are focussed upon the screen as indicated in the diagram Fig. 5, so as to produce combined simultaneous displays. Thus, the vertically moving display through one of the aperture gates may consist of descriptive matter relating to the horizontally moving pictorial display projected through the aperture gate and so forth.

Each optical projecting system indicated comprises a condenser C which together with an electric lamp D or other suitable source of light is mounted behind the base and an adjustable lens system E of known kind carried in a bracket F secured to the front of the base 2 so that the record disc 1 can rotate between the aperture gate 7 and the adjustable lens system E with its annular record track in register therewith so that the display matter on the record disc is projected as a moving luminous display upon a suitable screen.

To enable the record disc 1 to be intermittently operated while the driving pulley 3$b$ is run continuously, the record disc 1 is furnished with a plurality of spaced stop pins 10 which project outwardly from the front of the record disc and are arranged so that they cannot be displayed through the aperture gate 7 in the base as the record disc rotates. Such pins are arranged and adapted to contact a counterpoised or spring controlled detent 11 (see Fig. 4), pivotally mounted at 11$a$ in the bracket 12 secured to the front of the base 2. As shown the detent 11 is furnished with a counterpoise 11$b$ which carries a tailpiece 13 having a cam surface 13$a$ which is arranged and adapted so as to contact a trip pin 14 secured in the face of the grooved driving pulley 3$b$.

As illustrated the stop pins 10 are mounted in the opaque ring $d$ arranged concentrically on the record disc.

The spaced stop pins 10 correspond in number with the number of sections of display matter comprised in the annular record tracks $a$, $a'$, of the record disc and as the latter is rotated the stop pins successively abut the detent as the corresponding display on the rotating record disc is projected on to the screen so that the record disc is held until the detent is tripped by the pin 14 of the continually rotating driving pulley 3$b$. After being tripped the detent is returned by its counterpoise to its normal engaging position so that by means of the detent and trip mechanism an intermittent rotary motion is imparted to the record disc. The arrangement is such that the disc is brought temporarily to rest when the related parts of the various combined displays (i. e. the vertically moving part and the horizontally moving part as seen in Fig. 1) come into a predetermined position as required for the combined display.

The pivoted detent may be mounted so that it can be rendered inoperative when it is desired to run the record disc continuously to produce a continuously moving luminous display. For example the pivoted detent 11$a$ may be detachably mounted in its bracket 12 or such supporting bracket may be mounted so that it can be turned down to bring the detent out of the path of the stop pins on the record disc.

The circumferential edge of the record disc 1 is preferably rounded so as to facilitate its smooth frictional engagement with its grooved supporting pulleys or rollers 3, 3$a$, 3$b$, which latter may be made of metal, fibre, wood or other suitable material or materials, while to enable the record disc to be readily removed from and replaced edgewise on its supporting pulleys, one of these latter, for example the pulley 3$a$, is rotatably mounted in the forked end of a spring controlled bracket 8 pivotally mounted at 9 on the base 2 so that such bracket can be turned back to enable the disc to be easily lifted out and replaced, after which the bracket 8 is returned to its normal position to engage such pulley with the record disc as indicated.

The pulley or roller 3$b$ is mounted on a spindle 3$c$ that journals in the base 2 and is operably connected through reducing gear 3$d$ to the electric motor B.

Figs. 6 and 7 are diagrams illustrating a transparent record disc 1 furnished with three concentric annular record tracks $a$, $a'$, $a^2$, separated by opaque rings $d$, $d'$.

The outer edge of the outer concentric track 2 is defined by an opaque border 5 arranged upon the outer edge of the record disc 1, and the inner edge of the inner concentric track $a$ is defined by the smaller diametered opaque disc 4 arranged centrally of the record disc as previously described.

Such record disc is mounted edgewise upon grooved pulleys or rollers as previously described and rotates past the three aperture gates 7, 7', 7$^2$ arranged in the base 2 so that each registers with one of the concentric records on the rotatable record disc 1, while the angular relationship of the three aperture gates 7, 7', 7$^2$ to each other and the rotating record disc, is arranged to give a simultaneous display of three projections so that each appears to move in a different direction across the screen on which the lens systems of the three gates are focussed as indicated in diagrammatic view, Fig. 7, to simultaneously superimpose the three projections on the screen so as to produce a combined moving optical display thereon.

The record disc or the display matter may be tinted to give various color effects, or a further translucent or transparent color disc may be rotatably mounted together with the record disc so that the discs can be rotated to give color effects in the projected luminous display.

The color disc may be of the same dimensions as the record disc and is mounted edgewise in front of the latter upon a second set of grooved pulleys rotatably mounted upon the same spindles as those of the grooved pulleys or rollers which carry the record disc.

The color disc may be readily rotated by the driving pulley of the record disc and for this purpose a small grooved pulley may be attached to the outer face of the record disc driving pulley, such small pulley being operably connected by a cord to a similar pulley secured to the face of one of the pulleys which carries the color disc so that as the driving pulley of the record disc is rotated, motion is imparted to the color disc either in the same or the reverse direction by the belt gear through which the pulleys supporting the color disc are operably connected with the driving pulley of the record disc.

What we claim is:

Optical projection apparatus comprising a disc for supporting matter to be projected, rollers supporting the disc at its edges for rotation, means to drive constantly one of the rollers to rotate the disc, the matter being disposed in separate items arranged in annular tracks concentric with the axis of rotation of the disc and the said items forming sets to provide a composite matter for display, a plurality of optical projectors one for each track on the disc, the said projectors being angularly separated about the axis of rotation of the disc and the said projectors being positioned for direct projection to the same projection area of a single screen, and means to bring the carrier to rest for a predetermined period with the items of different sets held in register with the respective projector, the said means comprising a detent to engage angularly spaced abutments on the disc and a release device operated by the constantly driven roller to move the detent clear of the abutments.

WILLIAM STANLEY ALDRICH.
EDWARD CHARLTON ALDRICH.

REFERENCES CITED

The following references are of record in the file of this patent:

UNITED STATES PATENTS

| Number | Name | Date |
|---|---|---|
| 595,541 | Hollen | Dec. 14, 1897 |
| 744,778 | Menchen | Nov. 24, 1903 |
| 973,962 | Oliver | Oct. 25, 1910 |
| 1,313,241 | Ashley | Aug. 19, 1919 |
| 1,515,443 | Redinger | Nov. 11, 1924 |
| 1,597,919 | Marshall | Aug. 31, 1926 |
| 1,645,204 | Nothstine | Oct. 11, 1927 |
| 1,657,415 | Smith | Jan. 24, 1928 |
| 1,698,013 | De Zeng | Jan. 8, 1929 |
| 1,761,360 | Oberg et al. | June 3, 1930 |
| 1,788,808 | Stein | Jan. 13, 1931 |
| 1,992,776 | Schindler | Feb. 26, 1935 |